(12) United States Patent
Sasaki et al.

(10) Patent No.: US 6,337,380 B1
(45) Date of Patent: Jan. 8, 2002

(54) POLYMER HAVING SULFONIC ACID GROUP AND SILVER HALIDE PHOTOGRAPHIC PHOTOSENSITIVE MATERIAL USING THE POLYMER

(75) Inventors: Hiroki Sasaki; Hiroshi Kawamoto; Yuko Saito; Masatoshi Nakanishi, all of Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/451,756

(22) Filed: Dec. 1, 1999

(30) Foreign Application Priority Data

Dec. 1, 1998 (JP) .......................................... 10-341878
Dec. 1, 1998 (JP) .......................................... 10-341879

(51) Int. Cl.⁷ .............................................. C08F 128/02
(52) U.S. Cl. ...................................... 526/287; 430/522
(58) Field of Search ......................................... 526/287

(56) References Cited

U.S. PATENT DOCUMENTS 5,278,037 A    1/1994  Karino

FOREIGN PATENT DOCUMENTS

| JP | 49-66580 | 6/1974 |
| JP | 53-39119 | 4/1978 |
| JP | 6-199557 | 7/1994 |

OTHER PUBLICATIONS

CA abstract 1973:420174 of DE 1,443,915, Bahr et al, pp 1–3, Dec. 1968.*

* cited by examiner

Primary Examiner—Bernard Lipman
(74) Attorney, Agent, or Firm—Burns, Doane, Swecker & Mathis, LLP

(57) ABSTRACT

Provided are: a polymer comprising a repeating unit represented by formula (I):

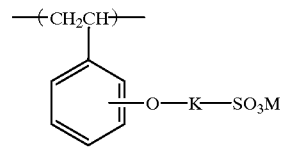

wherein K represents an alkylene group; M represents a monovalent cation group; a dispersant including the polmer; and a silver halide photographic photosensitive material containing water-insoluble photographic solid grains dispersed in use of the dispersant. The dispersant of the invention prevents the surface tension from lowering where the solid fine grains are dispersed, thereby improving dispersing property and dispersion stability. The silver halide photographic photosensitive material according to the invention has good color reproducibility and improves storability before use and latent image storability at the same time.

14 Claims, No Drawings

POLYMER HAVING SULFONIC ACID GROUP AND SILVER HALIDE PHOTOGRAPHIC PHOTOSENSITIVE MATERIAL USING THE POLYMER

TECHNICAL FIELD

This invention relates to a novel polymer, usage of the polymer, and a silver halide photographic photosensitive material using the polymer.

RELATED ART

Various polymers having sulfate in molecule have been provided. For example, Japanese Unexamined Patent Publication (KOKAI) Heisei, No. 6-199,557, describes a sulfate as an additional compound of p-vinyl phenol polymer ethylene oxide is used for a builder for cements. Japanese Unexamined Patent Publication (KOAI) Showa, No. 53-39, 119 describes a silver halide photographic photosensitive material containing polyvinylbenzene alkylsulfate. Also, Japanese Unexamined Patent Publication (KOKAI) Showa, No. 49-66,580 describes a sulfate of polyvinylphenol as a polymer conductivity controlling agent. Polystyrene sulfate, in addition to these materials, has been set forth in many patent specifications.

Where the above polymer is used as a dispersant, there raise problems that the particle size of a dispersed solid does not become so small, that the liquid dispersion cannot be handled easily due to the very high viscosity, and that precipitation and aggregation occur where the liquid dispersion has a bad stability. Where the polymer is mixed with hydrophilic colloids, there raise problems such that aggregation occurs or that the absorption spectrum of a coating film containing dyes is broadened.

It is an object of the invention to provide a novel polymer suppressing those problems. It is another object of the invention to develop usage of the polymer, more specifically to provide a dispersant not suffering from lowered surface tension when fine solid particles are dispersed, with improved dispersing property and improved dispersion stability. It is a further object of the invention to provide a silver halide photographic photosensitive material having good color reproductivity and improving storability before use and latent image storability at the same tome.

SUMMARY OF THE INVENTION

The foregoing objects are accomplished by the invention to provide a polymer comprising a repeating unit represented by formula (I):

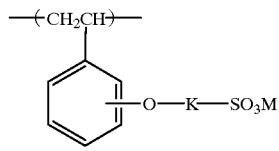

wherein K represents an alkylene group; M represents a monovalent cation group. In formula (I), K is preferably an alkylene group having 1 to 50 carbon atoms, more preferably, an alkylene group having 1 to 50 carbon atoms, and further preferably, a propylene group or a butylene group. The weight-averaged molecular weight of the invented polymer is preferably of $10^3$ to $10^6$, and the polymer consists solely of the repeating unit, or comprises 95 mol % or less of a repeating unit derived from ethylenic unsaturated monomers capable of copolymerizing other than the repeating unit represented by formula (I), in addition to repeating unit represented by formula (I). As an ethylenic unsaturated monomer capable of copolymerizing, exemplified are the group consisting of styrene, styrene derivatives, acrylic acid, acrylic acid derivatives, methacrylic acid, and methacrylic acid derivatives.

This invention further provides a silver halide photographic photosensitive material having at least one layer containing photosensitive silver halide, comprising the polymer comprising a repeating unit represented by formula (I). Particularly, this invention provides a silver halide photographic photosensitive material having, on a support, at least one layer containing photosensitive silver halide, and at least one layer including water-insoluble photographic solid grains formed on the support, wherein the water-insoluble photographic solid grains are dispersed as fine grains by the polymer comprising a repeating unit represented by formula (I) as a dispersant. As a water-insoluble photographic useful solid grains, exemplified is a dye compound represented by formula (II):

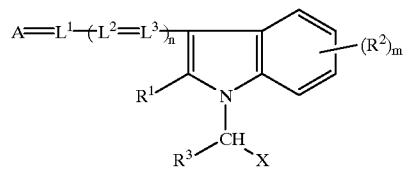

wherein A represents an acidic nucleus; $L^1$, $L^2$, $L^3$ each independently represents a methine group which can be substituted; $R^1$, $R^2$, and $R^3$ each independently represents a hydrogen atom or a substituent; n denotes 0 or 1; m denotes an integer from 0 to 4; a plurality of $R^2$ can be the same to or the different from one another when m denotes an integer of 2 to 4; X denotes an electron withdrawing group having a Hammett's sigma value $\sigma_m$ of 0.3 to 1.5.

This invention also provides a method for dispersing water-insoluble solid grains, particularly, solid grains for silver halide photographic photosensitive material, as fine grains using the dispersant containing the polymer comprising a repeating unit represented by formula (I).

It is to be noted that in this specification, a range includes the upper limit and the lower limit as within the range.

DETAILED DESCRIPTION OF THE INVENTION

Hereinafter, this invention is described in detail.

The polymer of the invention includes a repeating unit represented by formula (I). In formula (I), K represents an alkylene group. More specifically, an alkylene group having 1 to 50 carbon atoms. Those alkylene group may be substituted.

The K, inter alia, preferably represents an alkylene group having 1 to 5 carbon atoms. More specifically, ethylene group, propylene group, butylenes group, and hexylene group can be exemplified. The K is more preferably a propylene group or butylene group.

In formula (I), M represents monovalent cation group. More specifically, cations such as hydrogen, sodium, potassium, lithium, ammonium, and the like can be exemplified. Sodium cation, inter alia, is most preferable.

The weight-averaged molecular weight of the polymer according to the invention is preferably of $10^3$ to $10^6$, more preferably $10^3$ to $10^5$, and further preferably $3\times10^3$ to $3\times10^4$.

The polymer according to the invention can be a homopolymer or copolymer solely containing one type or two or more types of the repeating unit represented by formula (I), or can be a copolymer including the repeating unit represented by formula (I), and a 95 mol % or less of a repeating unit derived from ethylenic unsaturated monomers capable of copolymerizing other than the repeating unit represented by formula (I).

As an ethylenic unsaturated monomer capable of copolymerizing other than the repeating unit represented by formula (I), exemplified are one type or two or more types of monomers selected from the group consisting of styrene, styrene derivatives, acrylic acid, acrylic acid derivatives, methacrylic acid, and methacrylic acid derivatives.

As a styrene derivative, vinyl toluene, hydroxystyrene, acyloxystyrene, alkoxystryrene, halogenated styrene, vinylbenzene carboxylic acid and salts and acids thereof are preferable. As an acyloxystyrene, acetoxystyrene is preferable. As an alkoxystryrene, t-butoxystyrene is preferable. As a halogenated styrene, bromostyrene and chlorostyrene are preferable.

As an acrylic acid derivative or methacrylic acid derivative, alkyl acrylate, alkyl methacrylate, cycloalkyl acrylate, cycloalkyl methacrylate, acrylic salt, methacrylic salt, and acrylonitrile are preferable.

Among those, styrene, vinyl toluene, hydroxystyrene, vinylbenzene carboxylic acid and salts thereof, alkyl acrylate, alkyl methacrylate, cycloalkyl methacrylate, and acrylonitrile are preferable.

Where the polymer of the invention is a copolymer including a repeating unit derived from an ethylenic unsaturated monomer, which is capable of copolymerizing other than the repeating unit represented by formula (I). The repeating unit derived from an ethylenic unsaturated monomer, capable of copolymerizing other than the repeating unit represented by formula (I), is present in an amount, in all the polymer, of 95 mol % or less, more preferably 85 mol % or less, and further preferably, 80 mol % or less.

The polymer of the invention can be manufactured by, e.g., the following two methods. The first method is to synthesize monomers introduced with sulfonic acid group and then solely polymerizing the monomer or co-polymerizing the monomers; the second method is to introduce sulfonic acid group by polymer reactions after a homopolymer or copolymer is obtained by sole polymerization, or copolymerization of vinyl phenol or monomers in which hydroxyl group of vinyl phenol is protected. The synthetic method according to the purpose.

[The First Method]

With respect to introduction of the sulfonic acid group, methods set forth in Kogyo Kagaku (Magazine) Vol. 73, 563 (1970), Vol. 59, 221 (1956), and J. Am. Chem. Soc. Vol. 77, 2496 (1955) can be referred.

When the monomers to which sulfonic acid group is introduced are polymerized solely or copolymerized, it is preferable to make polymerization by a radical polymerization method. In a copolymerization of monomers having sulfonic acid group and other monomers, a polymerization solvent can be a single base solvent such as methyl sulfoxide (DMSO), dimethyl formamide (DMF), and a mixture base solvent such as DMF and water (for example, a ratio of 8 to 2 (DMF to water) by volume).

[The Second Method]

When a vinyl phenol is polymerized solely or copolymerized, methods set forth in J. Polym. Sci. A-1 Vol. 7, 2175 (1969), 2405 (1969) can be referred. The homopolymer or copolymer of vinyl phenol can be polymerized from monomers commercially available or can be made using a polymer or polymers commercially available.

When monomers in which hydroxyl group of vinyl phenol is protected are polymerized solely or copolymerized, a well known protective group such as methyl group, t-butyl group can be used. As a monomer where the hydroxyl group of the vinyl phenol is protected, methoxystyrene, t-butoxystyrene, and the like can be exemplified. The sole polymerization or copolymerization of the monomers in which hydroxyl group of vinyl phenol is protected can be proceeded by any of a radical polymerization method, an anion polymerization method, and cation polymerization method. In this situation, living polymerization or the like can be used, and in the case of copolymerization, block polymers can be synthesized. Thereafter, the protective group of the hydroxyl group can be deprotected in an ordinary manner. For example, deprotection can be proceeded easily with boron tribromide, bromic acid, trifluoromethane sulfuric acid, and the like. Regarding deprotection of protective groups, Macromolecules, Vol. 16, 510 (1983), Vol. 22, 509 (1989) can be referred.

Subsequently, the sulfonic acid group is introduced utilizing the hydroxyl group. For introduction of the sulfonic acid group, a Williamson ether synthetic method can be used. That is, after the hydroxyl group is converted to a phenolate anion by sodium methylate, sodium ethylate, potassium t-butoxide, sodium hydroxyl, sodium metal, and the like, the sulfonic acid group can be introduced by.dropping addition of propane sultone, butane sultone, or sulfoalkyl halide such as chloroethane sodium sulfate. Where the introduction rate of the sulfonic acid group is set about 50 mol % or less, it can be introduced in a quantitative manner. If the introduction rate of the sulfonic acid group is set about 50 mol % or more, a slightly excessive reagent (e.g., about 1.2 time of the equivalent) is used. The reaction temperature is preferably at room temperature or higher, more preferably 45° C. to 70° C., further preferably around 60° C. The reaction time, though depending on the reaction temperature, is about several hours (two to five hours), and a mild proceeding is preferred. With respect to introduction of sulfonic acid, methods set forth in Kogyo Kagaku (Magazine) Vol. 73, 563 (1970), Vol. 59, 221 (1956), and J. Am. Chem. Soc. Vol. 77, 2496 (1955) can be referred.

Specific examples of the polymer according to the invention are described below. The weight-averaged molecular weight can be measured in a normal way.

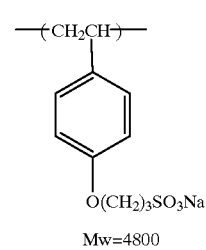

P-1

Mw=4800

P-2 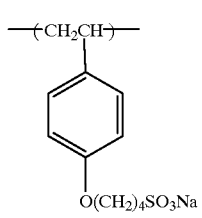
Mw=5400
P-3 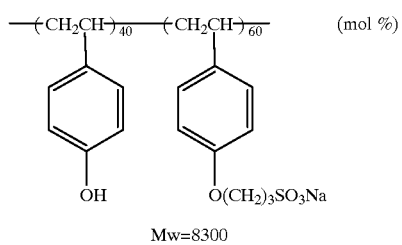
Mw=8300
P-4 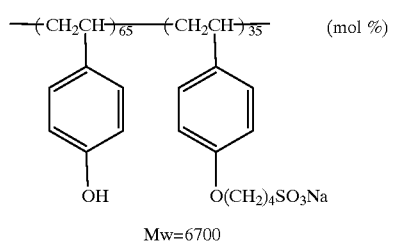
Mw=6700
P-5 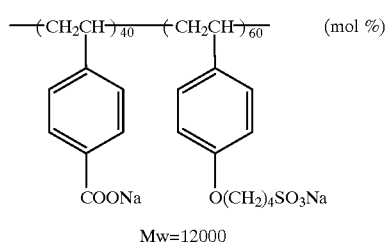
Mw=12000
(Mw denotes weight-averaged molecular weight)
P-6 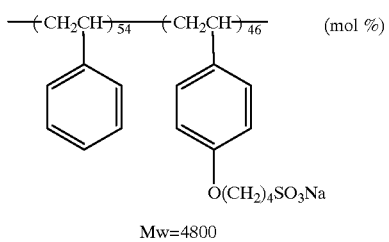
Mw=4800
P-7 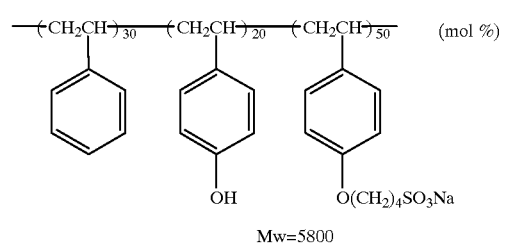
Mw=5800
P-8 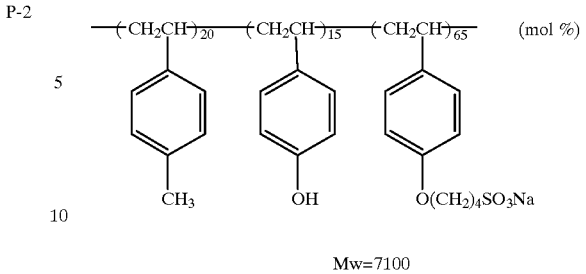
Mw=7100
P-9 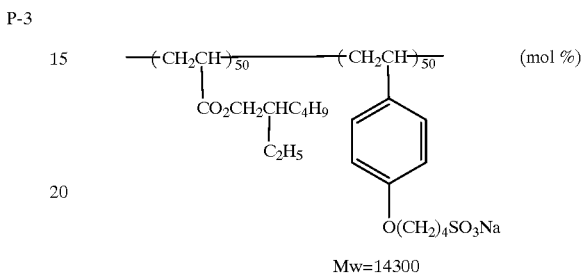
Mw=14300
P-10 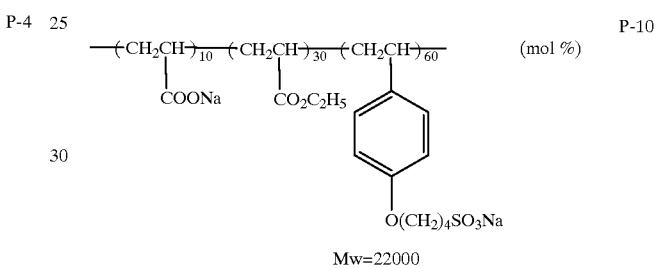
Mw=22000
P-11 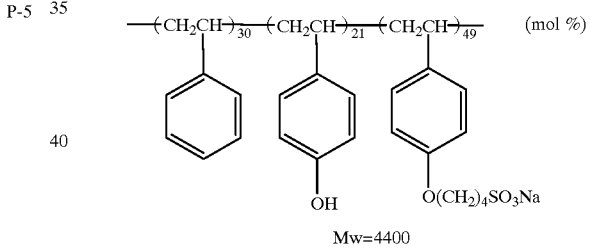
Mw=4400
P-12 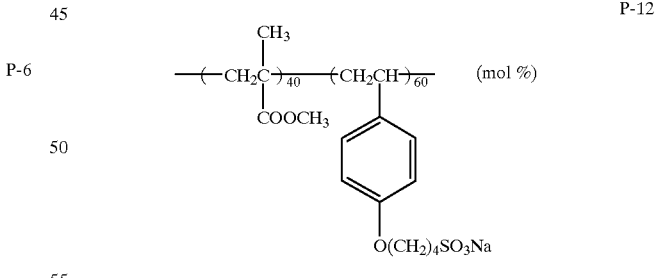
Mw=8300
P-13 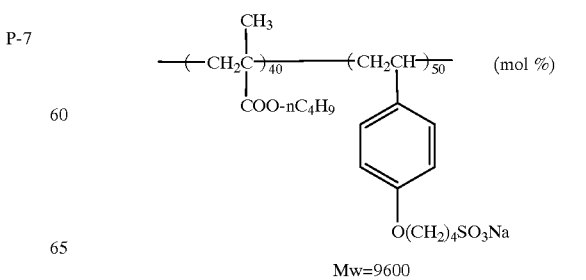
Mw=9600

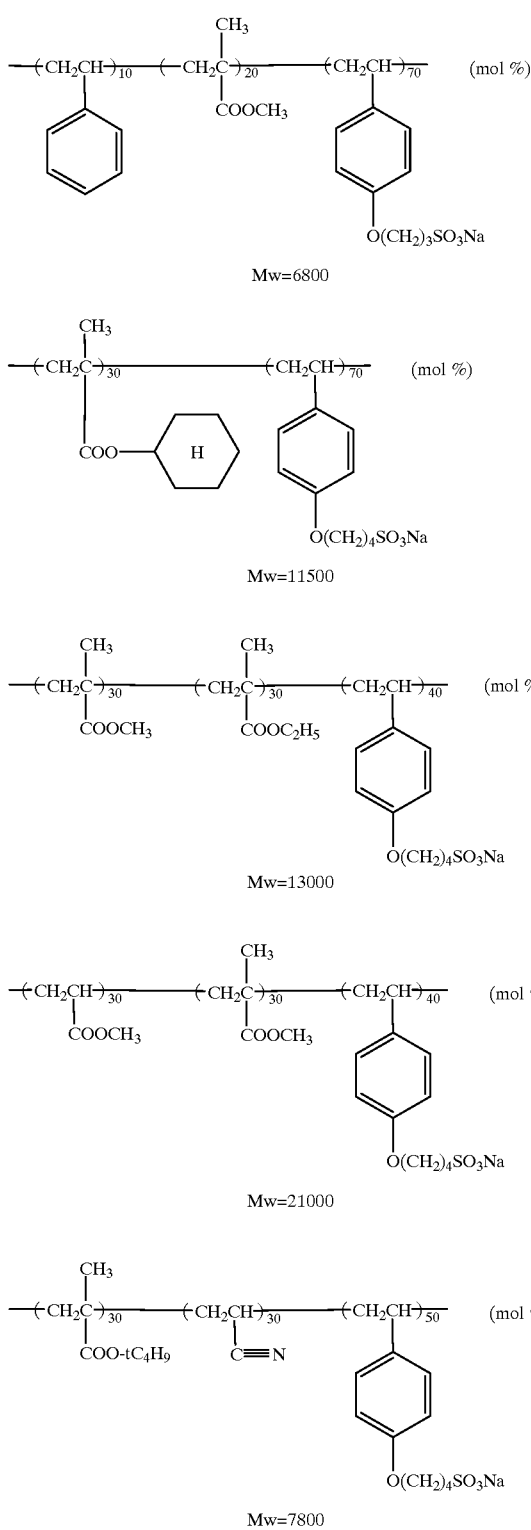

The polymer according to the invention is useful as a dispersant. This polymer can also be used as antistatic agent, a thickener, and a precipitant. Those dispersant, antistatic agent, thickener, and precipitant may contain one type of the invented polymer or may contain two types or more at an arbitrary rate. Other components may be contained as appropriate.

For example, a dispersant may contain another dispersant or other dispersants in addition to the invented polymer. The use amount of the invented dispersant is preferably 1 to 100% by weight to the material to be dispersed, more preferably 20 to 30% by weight. The dispersant according to the invention can be used for various dispersion systems such as solid dispersion, emulsion dispersion, deposition dispersion, and the like.

As a method for rendering a material to be dispersed subjecting to solid dispersion using the dispersant according to the invention, known methods can be used. Details of such a solid dispersion method are described in "Rinousei Ganryo no Ohyou Gijyutu (Applied Techniques of Functional Pigments)" Published by CMC (1991). A dispersion media method, among those, is most general. In this method, the materials to be dispersed in a form of powders or in a wet cake form are made into an aqueous slurry in water together with the dispersant of the invention, using a known mill (e.g., ball mill, sand mill, roller mill, super apex mill, or spike mill), where dispersion media (e.g., glass beads, alumina beads, zirconia beads, and the like) exist, dispersion is made by grinding mechanically the materials. The average diameter of the beads as the dispersion media is preferably 0.005 to 1 mm, more preferably 0.1 to 0.5 mm, further preferably 0.1 to 0.3 mm. The filling rate is preferably 70% or higher, more preferably 80% or higher. Circumferential speed is preferably 4m/second or more, more preferably 8 m/second or more, furthermore preferably 10 m/second or more. The temperature is preferably at 100° C. or less, more preferably 40° C. or less. The work density is preferably 0.5 kw/liter or higher as per real volume of dispersion chamber, more preferably 2 kw/liter or higher. In addition to the above mills, a roller mill, a homogenizer, a high pressure homogenizer, a colloid mill, a dissolver, a high speed impeller agitator, an ultrasound dispersing apparatus (e.g., micro-fuldizer) can be used.

As other solid dispersing methods, exemplified are, for example, as described in Japanese Unexamined Patent Publication Heisei No. 3-182,743, a method in which after materials to be dispersed are solved in water by adjusting the pH of the materials to be dispersed to be normally alkaline upon selection of substituents, the pH is lowered under existence of the invented dispersant to obtain the fine solid positioned, dispersed materials, and, as disclosed in U.S. Pat No. 2,870,012, a method in which after the materials are dissolved in an appropriate solvent, a poor solvent of the materials to be dispersed is added under existence of the invented dispersant to deposit the dispersed materials thereby obtaining fine particle dispersed solid.

Where the invented dispersant is used for solid dispersion, a low molecular surfactant can be used together, but the low molecular surfactant may lower the surface tension, thereby impairing coating property of the materials to be dispersed. In a case where the materials to be dispersed are photographic materials in which the materials to be dispersed migrate in a diffusing manner in the hydrophilic colloid layer, it is foreseeable that a problem that such migrations adversely affects the photographic property may occur, so that a use amount of the surfactant should be carefully determined. When a low molecular surfactant is used together, the use amount is preferably 50% by weight or lower with respect to the polymer including the repeating unit represented by formula (I) in the invented dispersant, more preferably 20% by weight or lower, and further preferably 10% by weight or lower.

As examples of the materials to be dispersed usable for the dispersant of the invention, exemplified are a dye image forming coupler, a color mixing prevention agent, a dye-providing redox compound, a fog-preventing agent, a reducing agent, an ultraviolet absorbing agent, a anti-fading agent, a nucleation agent, a dye image stabilizing agent, a silver halide solvent, a bleaching promoting agent, dyes for filter and those precursors, organic or inorganic compounds such as dyes, pigments, organic silver salt, silica, $TiO_2$, zinc oxide, iron oxide, inorganic pigments such as carbon black (micro powder carbons), organic polymer, and organic and inorganic composite polymers, and the like. As specific examples of such materials to be dispersed, compounds as set forth in, e.g., Research Disclosure No. 17,643, No. 18,716, and No. 307,105 can be exemplified.

The dispersant according to the invention is suitable particularly for dispersion of water-insoluble photographic solid particles used for silver halide photographic photosensitive materials. The dispersant according to the invention is suitably used for dispersing water-insoluble photographic solid particles in a form of fine grains in a silver halide photographic photosensitive material having, on a support, at least one layer containing photosensitive silver halide, and at least one layer of hydrophilic colloids including water-insoluble photographic solid grains.

In the invention, the silver halide photographic photosensitive material can be, in addition to ordinary silver halide photographic photosensitive materials, photothermographic materials. For systems of the photothermographic materials and details of such photothermographic materials, Japanese Patent Publication (KOKOKU) Heisei No. 3-10,391, Japanese Patent Publication (KOKOKU) Heisei No. 6-52,387, Japanese Unexamined Patent Publication (KOKAI) Heisei, No. 5-341,432, Japanese Unexamined Patent Publication (KOKAX) Heisei, No. 6-194,781, Japanese Unexamined Patent Publication (KOKAI) Heisei, No. 7-13,295, Japanese Unexamined Patent Publication (KOKAI) Heisei, No.10-221,808, Japanese Unexamined Patent Publication ((OKAI) Heisei, No. 10-288,23, Japanese Unexamined Patent Publication (KOKAI) Heisei, No10-339,934, U.S. Pat. No. 5,380,635, and the like can be referred.

With such a photothermographic material, as water-insoluble photographic solid grains that can be dispersed in a solid form by the invented dispersant, exemplified are a reducing agent, an organic acid salt, a nucleation agent, a toning agent, a torning improving agent, a fog preventing agent, various dyes or pigments added for prevention of irradiation, and the like.

As a silver halide photographic photosensitive material to which the dispersant of the invention is applicable, a color reversal film, and a color negative film can be exemplified. Particularly, a general color negative film is preferred.

As a silver halide emulsion for producing the silver halide photographic photosensitive material, what is used is generally subject to physical ripening, chemical ripening, and color sensitizing. The advantages of the invention can be remarkably found when an emulsion more sensitized with a gold compound and a sulfur containing compound Additives used in such a process and known additives for photography that can be used in this invention are set forth in Research Disclosure No. 17,643, and No. 18,716, and the followings are posted locations.

| Additives | No. 17643 | No. 18716 |
|---|---|---|
| 1 Chemical Sensitizer | P. 23 | P. 648 right column. |
| 2 Sensitivity increaser | | The same as the above |

-continued

| Additives | No. 17643 | No. 18716 |
|---|---|---|
| 3 Spectrosensitizer, Supersensitizer | From P. 23 to P. 24 | From P. 648 right colon to P. 649 right column |
| 4 Brightener | P. 24 | |
| 5 Fog Preventing Agent and Stabilizer | From P. 24 to P. 25 | From P. 649 right column |
| 6 Light Absorber, Filter Dye, Ultraviolet Absorber | From P. 25 to P. 26 | From P. 650 left column to P. 650 right column |
| 7 Anti-stain Agent | P. 25 right column | From P. 650 left column to P. 650 right column |
| 8 Dye Image Stabilizer | P. 25 | |
| 9 Hardener | P. 26 | P. 651 left column |
| 10 Binding Agent | P. 26 | The same as the above |
| 11 Plasticizer, Lubricant | P. 27 | P. 650 left column |
| 12 Coating Aid and Surface Active Agent | From P. 26 to P. 27 | P. 650 right column |

The solid grains for photography dispersed in a solid form by the dispersant of the invention can be built-in at an arbitrary position of the silver halide photographic photosensitive material in an arbitrary amount according to the object. That is, the grains can be included in an undercoating layer, an anti-halation layer placed between a silver halide containing layer and a support, the silver halide containing layer, a yellow filter layer, an intermediate layer, a protection layer, a back layer located on the opposite side to the silver halide containing layer with respect to the support, and other assisting layers. It is preferable to be included in a hydrophilic collide layer, inter alia, more preferably, in a non-photosensitive layer, and further preferably, in a yellow filter layer.

The dispersant of the invention can be added not only in a single layer but also in multiple layers when necessary, and the dispersants of two or more types can be used independently or as a mixture in a single layer or multiple layers.

As hydrophilic colloids used in a photographic constitutive layer to which the dispersant of the invention is suitably applicable, gelatins are most preferable, and know various gelatins can be used. For example, gelatins made by different manufacturing methods, such as lime processed gelatin, acid processed gelatin, and the like, and gelatins chemically modified such as subjecting to phthalation or sulfonylation can be used. Moreover, the gelatins can be used upon desalting when necessary.

The dispersant of the invention is preferably used for dispersion of dyes in the silver halide photographic photosensitive material. The dye is preferably contained in a hydrophilic colloide layer made of a gelatin or gelatins. The use amount of the dyes may vary depending on kinds of used dyes, dispersion degree, necessary absorbance, and gelatin amount to be used. From a ratio to the gelatins, a range from $1/10^3$ to $1/3$ is preferable, and a range that optical concentration is 0.05 to 3.0 is preferable. The specific use amount of the dyes, though may vary depending on the dyes, is in general, $10^{-3}$ g/m$^2$ to 3.0 g/m$^2$, and particularly, a range between $10^{-3}$ g/m$^2$ to 1.0 g/m$^2$ is preferable.

The dyes dispersed by the dispersant of the invention can be used, when necessary, in combination with other various water-soluble dyes, water-soluble dyes adsorbed to mordant, dyes dispersed in an emulsion, and dispersed solid dyes manufactured by a method other than the method of the invention.

The dispersant of the invention is desirably used particularly for dispersion of the dyes represented by formula (II).

In formula, A represents an acid nucleus. The acid nucleus is not especially limited as long as it has an electrically negative ring structure, but preferably, it has more than one carbonyl group, for example, 5-pyrazolone, isoxazolone, barbituric acid, thiobarbituric acid, pyrazolopyridone, rhodamine, hydantoin, thiohydantoin, oxazolizindione, pyrazolizindione, indadione, hydroxypyridone, 1,2,3,4-tetrahydroquinoline-2, 4-dione, and 3-oxo-2, 3-dihydrobenzo[d]thiophene-1, and 1-dioxide, and preferably, 5-pyrazolone, hydroxypyridone, pyrazolopyridone, barbituric acid and isoxazolone, and more preferably, 5-pyrazolone.

$L^1$, $L^2$, and $L^3$ each independently represents a methine group which may be substituted. As a substituent of the methine group, for example, alkyl groups such as a methyl group, an ethyl group or the like, a cyano group, and a halogen atom such as a chloric atom or the like are raised. Preferably, $L^1$, $L^2$, and $L^3$ are non-substituted methine groups.

$R^1$, $R^2$, and $R^3$ each independently represents a hydrogen atom or a substitutent. As for the substituents shown as $R^1$, $R^2$, and $R^3$, for example, a substituted or non-substituted alkyl group having 1 to 8 carbon atoms (e.g., methyl, ethyl, propyl, isopropyl, n-butyl, isobutyl, sec-butyl, t-butyl, cyclohexyl, methoxyethyl, ethoxyethyl, ethoxycarbonylmethyl, ethoxycarbonylethyl, cyanoethyl, diethylaminoethyl, hydroxyethyl, chloroethyl, acetoxyethyl or the like), a substituted or non-substituted aralkyl group having 7 to 12 carbon atoms (e.g., benzyl, 2-carboxybenzyl or the like), a substituted or non-substituted aryl group having 6 to 18 carbon atoms (e.g., phenyl, 4-methylphenyl, 4-methoxylphenyl, 4-carboxyphenyl, 3,5-dicarboxyphenyl or the like), a substituted or non-substituted acyl group having 2 to 6 carbon atoms (e.g., acetyl, propionyl, butanoil, chloroacetyl or the like), a substituted or non-substituted sulfonyl group having 1 to 8 carbon atoms (e.g., methane sulfonyl, p-toluene sultonyl or the like), alkoxycarbonyl group having 2 to 6 carbon atoms (e.g., methoxycarbonyl, ethoxycarbonyl or the like), a substituted or non-substituted aryloxycarbonyl group having 7 to 12 carbon atoms (e.g., phenoxycarbonyl, 4-methylphenoxycarbonyl, 4-methoxyphenoxycarbonyl or the like), a substituted or non-substituted alkoxyl group having 1 to 4 carbon atoms (e.g., methoxy, ethoxy, n-butoxy, methoxyethoxy or the like), a substituted or non-substituted aryloxy group having 6 to 10 carbon atoms (e.g., phenoxy, 4-methoxyphenoxy or the like), a substituted or non-substituted acyloxy group having 2 to 8 carbon atoms (e.g., acetoxy, ethylcarbonyloxy, cyclohexylcarbonyloxy, benzoyloxy, chloroacetyloxy or the like), a substituted or non-substituted sulfonyloxy group having 1 to 6 carbon atoms (e.g., methanesulfonyloxy or the like), a carbamoyloxy group having 2 to 8 carbon atoms (e.g-, methylcarbamoyloxy, diethylcarbamoyloxy or the like), a substituted or non-substituted amino group or imino group having 8 or less carbon atoms (e.g, non-substituted amino, methyl amino, dimethyl amino, diethyl amino, phenyl amino, methoxyphenyl amino, chlorophenyl amino, morpholino, piperidino, pyrrolidino, pyridyl amino, methoxycarbonyl amino, n-butoxycarbonyl amino, phenoxycarbonyl amino, methylcarbamoyl amino, phenyl carbamoyl amino, acetyl amino, ethylcarbonyl amino, cyclohexylcarbonyl amino, benzoyl amino, chloroacetyl amino, methyl sulfonyl amino or the like), a substituted or non-substituted carbamoyl group having 1 to 8 carbon atoms (e.g., non-substituted carbamoyl, methylcarbamoyl, ethylcarbamoyl, n-butylcarbamoyl, t-butylcarbamoyl, dimethylcarbamoyl, morpholinocarbamoyl, pyrrclidinocarbamoyl or the like), a substituted or non-substituted sulfonamide group having 1 to 8 carbon atoms (e.g., methanesulfonamide, p-toluenesulfonamid or the like), a halogen atom (e.g., fluorine, chlorine, bromine or the like), hydroxyl group, nitro group, cyano group, and carboxyl group are raised.

$R^1$ is preferably a hydrogen atom, an alkyl group, an aryl group, an alkoxycarbonyl group, or an aryloxycarbonyl group, but more preferably, a hydrogen atom.

$R^2$ is preferably an alkyl group, an aryl group, an amino group, an alkoxy group, an acyloxy group, a carbamoyl group, a halogen atom, a nitro group, or a carboxyl group.

$R^3$ is preferably a hydrogen atom, an alkyl group, or an aryl group, but more preferably a hydrogen atom or an alkyl group, and further preferably, an alkyl group.

n denotes 0 or 1, but preferably 0.

m denotes an integer from 0 to 4, but preferably, 0, 1, or 2, and more preferably 0. A plurality of $R^2$ can be the same to or the different from one another when m denotes an integer of 2 to 4.

X denotes an electron withdrawing group having a Hammett's sigma value $\sigma_m$ of 0.3 to 1.5. The Hammett's sigma value $\sigma_m$ is described, for example, in Chem. Rev., 91,165 (1991). As an electron withdrawing group having a Hammett's substituent constant $\sigma_m$ of 0.3 to 1.5, followings are raised, for example, a Halogen atom (e.g., a fluorine atom ($\sigma_m$=0.34; the same unit used in followings), a chlorine atom (0.37), a bromine atom (0.39), an iodine atom (0.35)), a trifluoro methyl group (0.43), a cyano group (0.56), a formyl group (0.35), an acyl group (e.g., acetyl (0.38)), an acyloxy group (e.g., acetoxy (0.39)), a carboxyl group (0.37), an alkoxycarbonyl group (e.g., methoxycarbonyl (0.37)), an arylcarbonyl group (e.g., a phenylcarbonyl group (0.34)), an aryloxycarbonyl group (e.g., phenoxycarbonyl (0.37)), an alkylcarbamoyl group (e.g., methylcarbamoyl (0.35)), a nitro group (0.71), an arkylsulfinyl group (e.g., methylsulfinyl (0.52)), an arkylsulfonyl group (e.g., methylsulfonyl (0.60)), a sulfamoyl group (0.53) or the like, preferably an alkoxycarbonyl group, a cyano group or an arylcarbonyl group and more preferably an alkoxycarbonyl group or a cyano group and further preferably, an alkoxycarbonyl group.

As for the dye shown in formula (II), it is preferable that A is 5-pyrazolone, hydroxypyridone, pyrazolopyridone, barbituric acid or isoxazolone; n is 0; m is 0; $R^1$ is a hydrogen atom, $R^3$ is a hydrogen atom or alkyl group; and X is alkoxycarbonyl group or cyano group, and it is more preferable that A is 5-pyrazolone; n is 0; m is 0; $R^1$ is a hydrogen atom, $R^3$ is an alkyl group; and X is an alkoxycarbonyl group.

The dye represented by formula (II) is exemplified as follows, but the dye to be dispersed as a dispersant according to the present invention is not limited to this example.

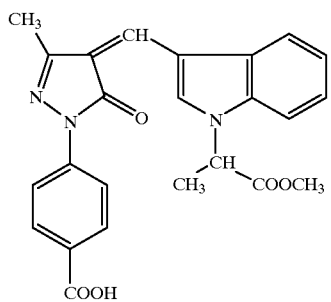

S-1

S-2
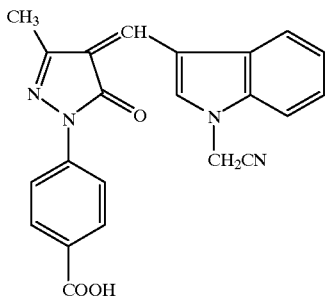
S-3
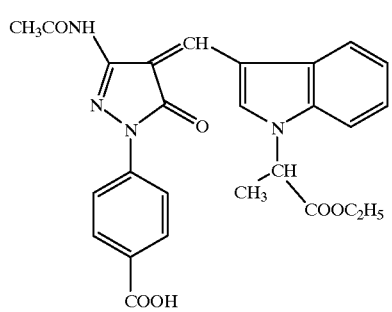
S-4
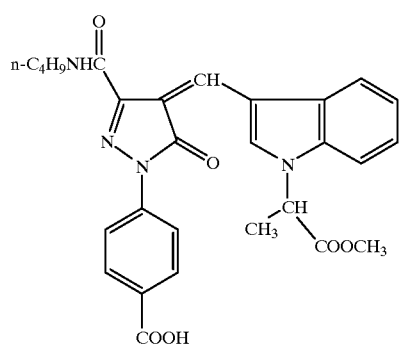
S-5
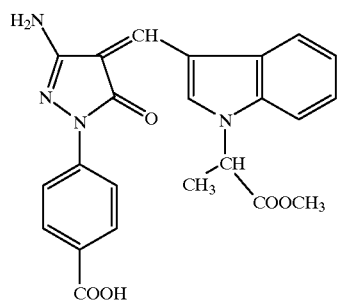
S-6
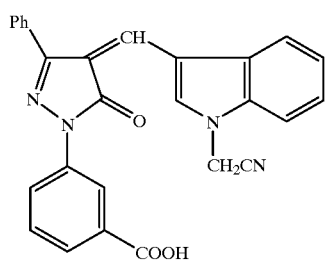
S-7
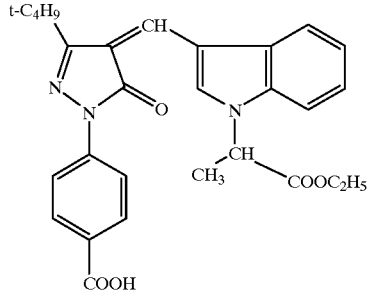
S-8
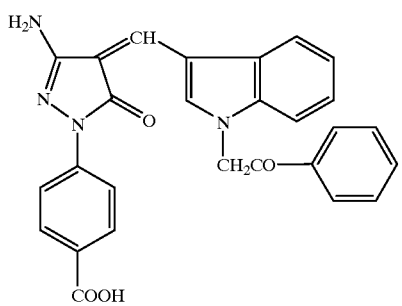
S-9
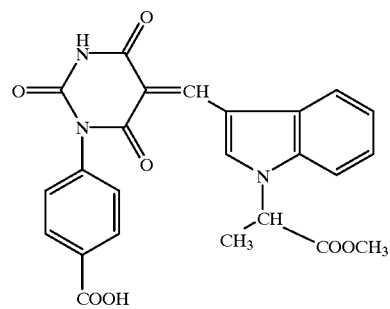
S-10
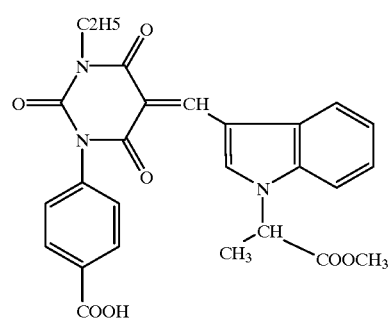
S-11
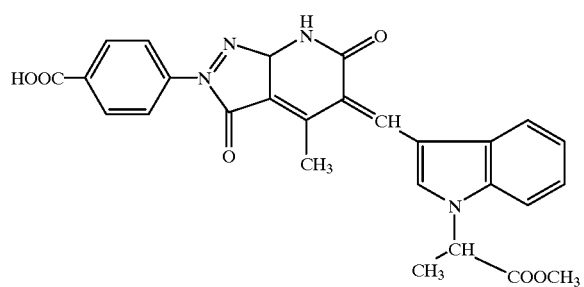

-continued

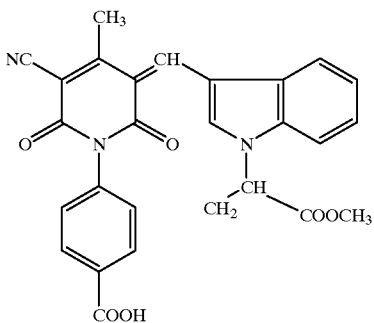

S-12

As described above, a novel polymer provided by this invention is useful as a dispersant. In addition, the dispersant of the invention does not suffer from lowering surface tension of dispersing material, and such problems rarely happen as deterioration of coating property along with degradation of surface tension caused by using a low molecular surfactant, diffuse transfer inside a hydrophilic colloid layer, and, in some cases, adversely effect on photographic performance. Also, the novel polymer has high dispersing ability and high dispersion stability, and when the polymer is used as a dispersant for a silver halide photographic photosensitive material, there provided high fixation rate to the inside of the structure layer in coating a hydrophilic colloid layer containing dispersing solids since solubilization property is low in a water-insoluble photographic usable compound. The silver halide photographic photosensitive material according to the invention excels in color reproducibility, and storability and latent image storability before use are concurrently improved.

The present invention is explained in more detail in describing embodiments as follows. The material, the amount for use, proportion and operation described in the embodiments can be suitably changed as long as the change is not deviated from the spirit of the invention. Thus, application of the invention is not limited to the embodiments described as below.

EXAMPLE 1

Synthesizing of Homopolymer (P-2)

A vinyl phenol (60 g) was solved in a methanol of 200 ml at room temperature. A sodium methoxide (27.5 g) was added, and the temperature was increased to 45° C. Ten minutes later, 1,4-butane sultone (60 g) was dropped for one hour, and then reactions were made for two hours at the internal temperature of 50° C. The reaction liquid was cooled down to the room temperature and poured in an acetone of one liter. After the liquid was stirred for 30 minutes at the room temperature, deposited solid was filtered,land 4-(p-vinyl phenoxy)-butane sulfonic acid was produced. The yield was 116.8 g (yield rate 85%). The produced material was identified with $^1$H-NMR.

The obtained 4-(p-vinyl phenoxy)-butane sulfonic acid (30 g) was solved in water of 150 ml at room temperature. Under nitrogen gas flow, 2,2'-azobis (2-amidinopropane) dihydrochloric acid salt (1.0 g) was added, and the temperature was increased to 65° C. Subsequently, reactions were made for five hours at the internal temperature of 65° C. The reaction liquid was cooled and poured in an acetone (800 ml). After the liquid was stirred for 31 hours at the room temperature, deposited solid was filtered and subject to vacuum drying for three days at 50° C., thereby producing a homopolymer (P-2). The yield was 23 g (yield rate 76%). The molecular weight was measured by GPC (Toso K.K. made HLC-8020GPC: Column GMPW, G4000PW, G2500PW) in which the eluate was water (additive salt LiBr 5 mmol).

EXAMPLE 2

Synthesizing of Copolymer (P-11)

Marukalinka CTS-70 (product name) made by Maruzen Sekiyu Kagaku (K.K.) [poly (4-hydroxystrene-CO-styrene) styrene having an average molecular weight of about 4000] (285.8 g) was solved in a methanol (900 ml) at room temperature. Sodium methoxide (28% methanol solution, SM-28 manufactured by Shonanwakou Co. Ltd.) (223.7 g) was added, and the internal temperature was heated up to 65° C. Twenty minutes later, 1,4-butane sultone (158 g) was dropped for one hour. Subsequently, reactions were made for four hours at the internal temperature of 65° C. The reaction liquid was cooled down to the room temperature and poured in an acetone (4.5 liters). After the liquid was stirred for one hour at the room temperature, deposited solid was filtered and subject to vacuum drying for three days at 50° C., thereby producing a copolymer:(P-11). The yield was 431.2 g (yield rate 91%).

A sulfoalkylation rate (composition rate) was sought from an area ratio of OH group of phenol when the peal areas of the aromatic ring, in performing the $^1$H-NMR measurement (DMSO-D6) for both of the original material (herein, Marukalinka CTS-70) and the reaction product. Such measurements can be done with $^{13}$C-NMR measurement. The molecular weight was measured by GPC (Toso K.K. made HLC-8020GPC: Column α4000, α-3000, α-2000) in which the eluate was a dimethyl formamide or DMF (additive salt LiBr 5 mmol). Consequently, the average molecular weight was 4400.

EXAMPLE 3

Synthesizing of Copolymer (P-9)

Azobisisobutylonitrile (0.95 g) was added to toluene (150 ml), and the temperature was increased to 80° C. Under nitrogen gas flow, a mixture solution of t-butoxystyrene (88 g), 2-ethylhexylacrylate (73.6 g), and toluene (80 ml) was dropped for two hours. Subsequently, azobisisobutylonitrile (0.31 g) was added, and reactions were made for six hours at the internal temperature of 80° C. The reaction liquid was cooled down to the room temperature and poured in a hexane of 3 liters. After the liquid was stirred for 30 minutes at the room temperature, deposited solid was filtered and subject to vacuum drying for three days at 50° C., thereby producing a polymer in which hydroxyl group is protected. The yield was 113 g (yield rate 70%).

The molecular weight was measured by GPC (Toso K.K. made HLC-8020GPC: Column $GMH_{XL}$, $G4000H_{XL}$, $G2000H_{XL}$) in which the eluate was a trimethyl formamide or TMF. As a result, the average molecular weight was 11,000. Where the $^1$H-NMR measurement ($CDCl_3$) was used, copolymer composition ratio was found to be one to one.

The protective groups of the hydroxyl group of the obtained polymer were deprotected in the following manner. The polymer (50 g) is dissolved in a mixed solvent of a toluene (150 ml) and a methanol (150 ml) at room temperature. A trifluoromethane sulfonic acid (20 g) was added, and reactions were made for two hours at room temperature. The reaction liquid was poured in a hexane (2 liters). After the liquid was stirred for 30 minutes at the room temperature, deposited solid was filtered and subject to vacuum drying for three days at 50° C., thereby producing a polymer having hydroxyl groups. The yield was 33 g (yield rate 98%).

It was confirmed that the protective groups were deprotected completely and that ester groups of the 2-ethylhexylacrylate were not cleaved, by means of the $^1$H-NMR measurement ($CDCl_3$).

Subsequently, sulfonic acid group was introduced in the following manner. The polymer (30 g), having hydroxyl groups obtained by deprotecting the protective groups, was dissolved in a methanol (150 ml) at room temperature. A sodium methoxide (1.6 g) was added, and the temperature was increased to 45° C. Thirty minutes later, 1,4-butane sultone (18 g) was added. Then, reactions were made for two hours at the internal temperature of 50° C. The reaction liquid was cooled down to the room temperature and poured in a hexane of one liter. After the liquid was stirred for 30 minutes at the room temperature, deposited solid was filtered and subject to vacuum drying for three days at 50° C., thereby producing a copolymer (p-9). The yield was 33 g (yield rate 982%).

It was confirmed that the copolymer composition ratio was one by one and that ester groups of the 2-ethylhexylacrylate were not cleaved, by means of the $^1$H-NMR measurement (DMSO-D6). The molecular weight was measured by GPC (Toso K.K. made HLC-8020GPC: Column α-4000, α-3000, α-2000) in which the eluate was a dimethyl formamide or DMF (additive salt LiBr 5 mmol). Consequently, the average molecular weight was 14300.

EXAMPLE 4

Preparation of Dye Dispersion

A dispersant shown in Table 1 was used. After a premix article was prepared according to the following subscription, the article was subject to dispersion for hours posted in Table 1 by a sand grinder, thereby preparing a dispersion of dye (S-1) (dispersion having a dye concentration of 25% by weight).

| <Prescription of the Premix Article> | |
|---|---|
| Wet cake of Dye (S-1) (solid portion 85.0%) | 58.2 g |
| Dispersant (in Table 1) | 5 to 18% with respect to the dye solid portion |
| Water | remainder |
| Total | 198 g |

To the contrary, as a comparative example, a polystyrene sulfonic acid sodium salt (PSSNa) (made by Lion (K.K.); Polity PS-1900 (product name)) was used to prepare the similar dispersed material.

With respect to the obtained dyedispersion, absorbance (absorption maximum wavelength λmax), dispersing degree and δ (dispersing degree) were sought, and the existence of precipitation of the dispersed material was observed. The absorbance was sought by diluting the obtained dispersed material with water to be a prescribed concentration and by measuring the absorption spectrum. That is, where the absorption maximum wavelength (λmax) was located around 440 nm, the absorbance (Dmax) at the λmax of the respective dispersed materials was sought as a relative value where the Dmax of No.9 in Table 1 was set as 100. The dispersing degree is obtained from a ratio, or namely, the absorbance at 500 nm divided by the absorbance at the λmax, upon measuring absorbances of 500 nm and λmax. The δ (dispersing degree) was differences in the dispersing degrees before or after a prescribed time passes, and is sought from the dispersing degree right after the dispersion minus the dispersing degree at 40° C. after one week passed. The existence of precipitation was observed with naked eyes after the obtained dispersed material was left for one month at room temperature. The results were shown in Table 1.

TABLE 1

| No. | Dispersing Agent Species | Dispersing Agent Amount | Dispersing Time | Dmax | Dispersing Degree | δ (Dispersing Degree) | Precipitation |
|---|---|---|---|---|---|---|---|
| 1 (Comp.) | PSSNa | 10 wt % | 4h | 83 | 0.39 | 0.18 | Slightly |
| 2 (Comp.) | PSSNa | 10 wt % | 10h | 67 | 0.35 | 0.17 | Slightly |
| 3 (Comp.) | PSSNa | 15 wt % | 4h | 84 | 0.37 | 0.14 | Slightly |
| 4 (Comp.) | PSSNa | 18 wt % | 10h | 86 | 0.35 | 0.13 | Slightly |
| 5 (Inv.) | P-4 | 10 wt % | 4h | 100 | 0.31 | 0.04 | Nothing |
| 6 (Inv.) | P-4 | 10 wt % | 10h | 114 | 0.21 | 0.05 | Nothing |
| 7 (Inv.) | P-4 | 16 wt % | 4h | 101 | 0.29 | 0.03 | Nothing |
| 9 (Inv.) | P-4 | 16 wt % | 10h | 115 | 0.19 | 0.02 | Nothing |
| 9 (Inv.) | P-6 | 10 wt % | 4h | 103 | 0.29 | 0.03 | Nothing |
| 10 (Inv.) | P-6 | 10 wt % | 10h | 118 | 0.16 | 0.04 | Nothing |
| 11 (Inv.) | P-6 | 18 wt % | 4h | 99 | 0.32 | 0.04 | Nothing |
| 12 (Inv.) | P-6 | 18 wt % | 10h | 115 | 0.21 | 0.05 | Nothing |
| 13 (Inv.) | P-11 | 10 wt % | 4h | 101 | 0.29 | 0.04 | Nothing |
| 14 (Inv.) | P-11 | 10 wt % | 10h | 115 | 0.20 | 0.05 | Nothing |
| 15 (Inv.) | P-11 | 18 wt % | 4h | 104 | 0.28 | 0.04 | Nothing |
| 16 (Inv.) | P-11 | 18 wt % | 10h | 115 | 0.19 | 0.04 | Nothing |

Comp.; Comparative example,
Inv.: Example of the invention

The dispersing property of the dispersed material is better as the Dmax is larger. The dispersing stability can be judged from changes in the δ (dispersing degree) and existence of precipitation. When the dispersing property is made worse, the δ (dispersing degree) becomes larger due to increased value of the dispersing degree.

As apparent from Table 1, when the dye (S-1) is dispersed by the dispersant of the invention, the dispersion property becomes better. In addition, where the dispersion time is made longer, the dispersion property is further improved when the dispersant of the invention is used whereas the comparative example hardly facilitates dispersion. The dye (S-1) used herein is a decoloring dye and has an advantage to reduce the loads of the developing liquid because the dye addition amount to the silver halide photographic photosensitive material can be reduced where the fine dispersion is made using the dispersant of the invention. In regard with the dispersion stability, the dispersed material using the dispersant of the invention has fewer changes along time in the dispersing degree, shows no precipitation, and possesses very high dispersion stability.

EXAMPLE 5

Preparation of Reducing Agent Dispersing Material

A dispersant shown in Table 2 was used After a premix article was prepared according to the following subscription, the article was subject to dispersion by means of a dispersing apparatus (1/4G sand grinder mill; Aimex (K.K.) made) as flowing cooling water for hours shown in Table 2, thereby producing a dispersed material for reducing agent (dispersed material has a reducing agent concentration of 20%).

<Prescription of the Premix Article>

| | |
|---|---|
| Reducing agent: 1,1-bis(2-hydroxy-3,5-dimethylphenyl)-3,5,5-trimethylhexane | 50 g |
| Dispersant (in Table 2): | 8 to 20% to reducing agent solid portion |
| Water | Remainder |
| Total | 250 g |

To the contrary, as a comparative example, a polystyrene sulfonic acid sodium salt (PSSNa) (made by Lion (K.K.); Polity PS-1900 (product name)) was used to prepare the similar dispersed material.

In Table 2, the dispersant amount is a weight rate to the reducing agent. The filtered amount is an amount of the dispersed materials passing through a filter (Fuji Photo Film made FE, hole diameter 10 µm, 25.4 cm)) during a prescribed time where the obtained dispersed material is filtered with the filter. Changes in the filtered amount before and after a specific time passes are differences in the filtered amount before and after the storage where the obtained dispersed material is stored for two weeks under a high humidity of 60% and 40° C. relative humidity. The existence of precipitation was observed with naked eyes after the obtained dispersed material was left for one month at room temperature The results were shown in Table 2.

TABLE 2

| | Dispersing Agent Species | Dispersing Agent Amount | Dispersing Time | Ave. Particle Size (µm) | in Filtered Amount | Changes Pre-Filtered Amount | cipitation |
|---|---|---|---|---|---|---|---|
| Specimen A (Inv.) | P-1 | 15% | 3 hours | 0.60 | 100 | 3 | Nothing |
| Specimen B (Inv.) | P-1 | 20% | 5 hours | 0.55 | 103 | 2 | Nothing |
| Specimen C (Inv.) | P-2 | 15% | 3 hours | 0.59 | 102 | 3 | Nothing |
| Specimen D (Inv.) | P-2 | 20% | 5 hours | 0.55 | 106 | 3 | Nothing |
| Specimen E (Inv.) | P-3 | 15% | 3 hours | 0.61 | 99 | 1 | Nothing |
| Specimen F (Inv.) | P-3 | 20% | 5 hours | 0.55 | 103 | 2 | Nothing |
| Specimen G (Inv.) | P-4 | 15% | 3 hours | 0.63 | 97 | 3 | Nothing |
| Specimen H (Inv.) | P-4 | 20% | 5 hours | 0.6 | 99 | 3 | Nothing |
| Specimen I (Inv.) | P-5 | 15% | 3 hours | 0.58 | 100 | 5 | Nothing |
| Specimen J (Inv.) | P-5 | 20% | 5 hours | 0.57 | 106 | 5 | Nothing |
| Specimen K (Comp.) | PSSNa | 15% | 3 hours | 0.75 | 88 | 15 | Existing |
| Specimen L (Comp.) | PSSNa | 20% | 5 hours | 0.71 | 86 | 13 | Existing |

As apparent from Table 2, if the reducing agent was dispersed in use of the dispersant of the invention, the dispersion property becomes better; the particle size can be made finer; the filtered amount can be larger. In regard with the dispersion stability, when dispersion is made in use of the dispersant of the invention, the dispersed material using the dispersant of the invention renders changes smaller before and after the prescribed time passes, shows no precipitation, and possesses very high dispersion stability.

Where the dispersed material is coated, with respect to the surface shape of the coating surface, the dispersed material using the dispersant of the invention did not create any comet, but in the case of the comparative example, few comets are produced.

In addition to the reducing agent, the same effects can be brought for other organic acid silver, a nucleating agent, a color toning agent, a color coupler, a tone improving agent, various type dyes and pigments attached to a viewpoint to prevention of the irradiation.

EXAMPLE 6

Production of Photosensitive Material
(1) Preparation of Dye Dispersed Material

The dye (S-1) (the same as a solid dispersant dye ExF-5 as the twelfth layer of the first embodiment in Japanese Unexamined Patent Publication (Kokai) Showa No. 11-38,568) was dispersed by the following method. That is, a 10% water solution of 4.95 g of the dispersant (p-4) of the invention and water (113.5 ml) were placed in a pot mill (700 ml), and a wet cake of the dye (solid portion 85.0%) (5.82 g) and a zirconia beads (diameter 1 mm) (500 ml) were added, and the contents were dispersed. The dispersing time was adjusted so that the dispersing degree defined in Example 4 becomes 0.42. A BO type vibration ball mill made by ChyuouKouki Sya was used for this distribution. The contents were taken out after dispersion; a gelatin water solution (12.5%, 8 g) was added; the beads were removed by filtering, and the gelatin dispersed material of the dye was obtained.

The dye dispersed materials were prepared in the same manner as above except that the dispersant of the dye (S-1) was set as P-6, P-11, PSSNa (comparative example).

Solid dyes other than the above are produced under the following condition- That is, water (21.7 ml), 5% sodium octylphenoxyethoxyethoxy ethane sulfonate (3 ml), and p-octylphenoxypolyoxyethyleneether (polymerization degree 10) (0.5 g) in 5% water solution were placed in a pot mill (700 ml), and the dye ExF-2 (or ExF-3, ExF-4) (5.0 g) and zirconia oxide beads (diameter 1 mm) (500 ml) were added to disperse the contents for two hours. A BO type vibration ball mill made by ChyuouKouki Sya was used for this distribution. The contents were taken out after dispersion; a gelatin water solution (12.5%, 8 g) was added; the beads were removed by filtering, and the gelatin dispersed material of the dye was obtained.

(2) Production of Specimen 101 to 104

A multilayer photosensitive material as set forth in First Example in Japanese Unexamined Patent Publication (Kokai) Showa No. 11-38,568 was produced using the dye dispersed material obtained by the above preparation (1). That is, the obtained dye dispersed material was used as the yellow filter layer coating liquid for the twelfth layer. The obtained photosensitive material was designated as specimen 101 to specimen 104 (comparative example), respectively, as using the dispersant: P-4, P-6, P-11, and PSSNa.

(3) Evaluation

Evaluation was made to the dye dispersed materials obtained by preparation (1) and the specimens obtained by production (2). That is, the dye dispersed material obtained by preparation (1) was stored for two weeks under a high humidity of 60% and 40° C. relative humidity, and before and after that time, the dispersed material was filtered by a filter (FG30 made by Fuji Photo Film (hole diameter 30 μm, 10 inches), and the filtered amount per a prescribed period was measured. The filtered amount is shown in Table 3 as a relative value when the filtered amount before storage of the dye dispersed material using the dispersant (P-4) was set as 100. The dye dispersed material was coated on a PET support in a single layer; absorbing spectrum of the coated film was measured; occurrences of comets were observed by naked eyes. The absorbance is shown in Table 3 as a relative value when the absorbance (absorption maximum wavelength; λmax) of the coated film before storage of the dye dispersed material using the dispersant (P-4) was set as 100.

Furthermore, the specimens obtained by production (2) were subject to a development processing and examined in substantially the same manner as First Example in Japanese Unexamined Patent Publication (Kokai) Showa No. 11-38, 568. The results were shown in Table 4.

TABLE 3

| Yellow Filter Layer Coating Fluid | Filtered Amount | Light Extinction Degree | Occurrence of Comet with Nucleus | Miscellaneous |
|---|---|---|---|---|
| Specimen 101 (Before Storage) | 100 | 100 | Nothing | Example of Invention |
| Specimen 101 (After Storage) | 97 | 98 | Nothing | Example of Invention |
| Specimen 102 (Before Storage) | 105 | 101 | Nothing | Example of Invention |
| Specimen 102 (After Storage) | 100 | 99 | Nothing | Example of Invention |
| Specimen 103 (Before Storage) | 103 | 101 | Nothing | Example of Invention |
| Specimen 103 (After Storage) | 99 | 100 | Nothing | Example of Invention |
| Specimen 104 (Before Storage) | 88 | 93 | Slightly | Comparative Example |
| Specimen 104 (After Storage) | 70 | 89 | Slightly | Comparative Example |

TABLE 4

| Specimen No. | Color Reproductivity (Hue Index) | Storability before use at High Temperature | Latent Image Storability |
|---|---|---|---|
| 101 (Example of the Invention) | 97 | −0.03 | −0.03 |
| 102 (Example of the Invention) | 98 | −0.02 | −0.02 |
| 103 (Example of the Invention) | 98 | −0.02 | −0.02 |
| 104 (Comparative Example) | 85 | −0.17 | −0.06 |

As apparent from Tables 3, 4, the dispersed material in use of the dispersant of the invention has a good dispersion property, can make the particle size further smaller, has a larger filtered amount, and creates no comet on a coated surface when coating is made. The silver halide color photographic photosensitive material produced by the dispersant of the invention has a good color reproductivity, and understandingly excels in property of storage before use and storage for lateat images.

What is claimed is:

1. A polymer comprising a first repeating unit represented by formula

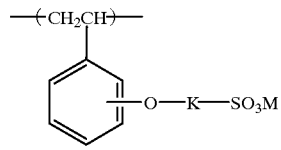

in an amount of 15 mole % or more of the total repeating units and a second repeating unit derived from an ethylenic unsaturated monomer, with the proviso that the second repeating unit is different than the first repeating unit, wherein K represents an alkylene group; M represents a monovalent cation group.

2. The polymer according to claim 1, wherein K represents an alkylene group having 1 to 50 carbon atoms in formula (I).

3. The polymer according to claim 1, wherein K represents an alkylene group having 1 to 5 carbon atoms in formula (I).

4. The polymer according to claim 3, wherein K represents a propylene group or a butylene group in formula (I).

5. The polymer according to claim 1, wherein a weight-averaged molecular weight of the polymer is of $10^3$ to $10^6$.

6. A polymer comprising a first repeating unit represented by formula (I):

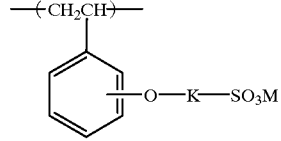

and a second repeating unit derived from a styrene or a styrene derivative, with the proviso that the second repeating unit is different than the first repeating unit, wherein K represents an alkylene group; M represents a monovalent cation group.

7. A silver halide photographic photosensitive material having at least one photosensitive silver halide layer, comprising at least one layer containing the polymer according to claim 1.

8. A silver halide photographic photosensitive material according to claim 7, water-insoluble photographic solid grains formed on the support, and the water-insoluble photographic solid grains are dispersed as fine grains by the polymer.

9. The silver halide photographic photosensitive material according to claim 8, wherein the water-insoluble photographic solid grains are a dye compound represented by formula (II):

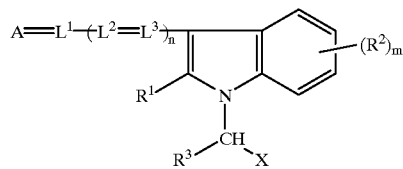

wherein A represents an acidic nucleus; $L^1$, $L^2$, and $L^3$ each independently represents a methine group which can be substituted; $R^1$, $R^2$, and $R^3$ each independently represents a hydrogen atom or a substituent; n denotes 0 or 1; m denotes an integer from 0 to 4; a plurality of $R^2$ can be the same to or the different from one another when m denotes an integer of 2 to 4; X denotes an electron withdrawing group having a Hammett's sigma value $\sigma_m$ of 0.3 to 1.5.

10. The silver halide photographic photosensitive material according to claim 9, wherein A denotes 5-pyrazolone, hydroxypridone, pyrazolopyridone, barbituric acid, or isoxazolone; n denotes 0; m denotes 0; $R^1$ denotes a hydrogen atom; $R^3$ denotes a hydrogen atom or an alkyl group; X denotes an alkoxycarbonyl group or cyano group.

11. The silver halide photographic photosensitive material according to claim 10, wherein A denotes 5-pyrazolone; n denotes 0; m denotes 0; $R^1$ denotes a hydrogen atom; $R^3$ denotes an alkyl group; x denotes an alkoxycarbonyl group.

12. A method for dispersing water-insoluble solid grains as fine grains using the polymer according to claim 1.

13. The polymer according to claim 6, wherein the styrene derivative is vinyl toluene, hydroxystyrene, acyloxystyrene, alkoxystyrene, hydrogened, styrene, vinyl benzene carboxylic acid, or salt or ester of vinyl benzene carboxylic acid.

14. A method for dispersing water-insoluble solid grains as fine grains using the polymer according to claim 6.

* * * * *